3,050,400
SAUSAGE PRODUCT HAVING IMPROVED PHYSICAL PROPERTIES AND METHOD OF PRODUCING THE SAME
Arthur E. Poarch, Mill Valley, and Eugene Gwozdz, Petaluma, Calif., assignors to Western Dairy Products, Inc., San Francisco, Calif., a corporation of California
No Drawing. Filed Aug. 19, 1959, Ser. No. 834,656
5 Claims. (Cl. 99—109)

This invention relates to the preparation of comminuted meat products comprising meat, fat, cereals, water, nonfat dry milk, curing salts and flavors. These comminuted meat products are exemplified in commerce by frankfurters, Bologna, salami and certain other loaf meats which may or may not be enclosed in natural or synthetic casing materials.

An object of the invention is to provide a comminuted meat product having improved physical characteristics, including a higher density, firmer texture, and less free fat, compared to those of presently available comminuted meat products.

A further object of the invention is to provide a method whereby such a meat product having such improved physical characteristics may be made.

A desirable and commercially used constituent of such meat product combinations is dry skim milk. Dry skim milk enhances the flavor and texture of the sausage and helps to prevent the excessive loss of moisture during processing and during the period when it is distributed to the consumer trade.

One of the difficulties encountered in the manufacture of sausage is the separation of the fat constituent from the comminuted mixture during the cooking and processing steps. Free fat may accumulate between the outside of the body of the meat product and the inside of the casing material. This accumulation of free fat is unsightly. Where meat loaf products are produced without the presence of a casing and are processed within the confines of a mold or pan, free fat may accumulate between the inner wall of the mold or pan and the body of the processed meat loaf.

The free fat which may separate from the body of the sausage may not only accumulate under the surface of the casing but may also appear as "fat pockets" within the sausage itself. This accumulation results in the uneven texture of the sausage and is likewise unsightly.

Regular dry skim milk powder as a constituent in sausage tends to prevent the accumulation of fat within the casing-sausage interface or as fat pockets in the body of the product. The degree to which regular dry skim milk powder will prevent fat separation depends, among other factors, upon the overall sausage formulation, the relative solubility of the milk powder and the processing and cooking techniques used in the preparation of the sausage. However, compared to certain natural gums, emulsifying agents and special protective colloids, dry skim milk powder has comparatively little ability to prevent the localizing accumulation of free fat.

Protective colloid materials such as the natural gums, sodium alginate and sodium caseinate are used to minimize fat separation by preventing the small fat particles from coalescing. These protective colloids leave much to be desired from the flavor and texture standpoint as a sausage ingredient, particularly when compared to regular dry skim milk powder.

It is known that the lactose contained in dry skim milk powder enhances and complements the flavor of sausage ingredients. The casein and albumin proteins of skim milk powder not only improve the nutritional properties of the sausage but likewise contribute to a better flavored product.

Skim milk powder improves the texture, tenderness, and smooth appearance of sausage containing it when compared to a product that does not contain dry skim milk powder.

From the commercial standpoint, it is obvious that a dry skim milk powder possessing an inherent ability to improve texture and flavor of sausage but having increased protective colloid properties, is most desirable.

We have discovered that specially treated skim milk powder has an increased ability to prevent fat separation within the product during the processing steps used in the preparation of the sausage.

One method to obtain this usual result is to treat skim milk to reduce the amount of calcium to 20%–70% of that normally present in the milk, concentrating the skim milk to 30%–35% solids and spray drying the product to obtain a powder. When this dry skim milk powder is added to sausage, the fat contained in the sausage has a marked tendency to be retained in the body of the meat product in a finely divided state.

The replacement of the calcium of skim milk with sodium to the extent of 20–70% of the calcium present often results in a dry skim powder having a pH above 7.5. It may be undesirable to add an alkaline dry skim milk powder to sausage, hence the replacement of the calcium with sodium followed by the replacement of the sodium with hydrogen ion will produce a skim milk having a pH between 6.0 and 7.0. A skim milk so treated, concentrated to 30%–35% solids and spray dried will overcome the possible objection of adding an alkaline material to the sausage.

Methods used to reduce the calcium in skim milk, to replace it with sodium and to reduce the pH by further treatments or additions are well known processes. These processes may be generally classed as ion exchange treatments where either complex silicates or resin polymers have the ability to loosely attach metal ions in their structure and to transfer these ions to an aqueous solution in exchange for dissimilar metal ions that may be normally present in the solution.

We prefer to use an exchange process where fresh skim milk with a normal calcium content is brought into intimate contact with exchange resins or exchange silicates that are in the sodium state. After the required exchange has taken place to the extent of 20–70% of the calcium originally present in the skim milk, and the indicated amount of calcium has been replaced by sodium, the skim milk is concentrated by evaporation and dried to a powder by either spray or roller drying methods.

If the extent of the calcium-sodium exchange has been sufficient to increase the pH of the skim milk substantially above 7.0, the pH may be reduced to a value below 7.0 by contacting the skim milk with a resin exchange material in its hydrogen state.

For certain applications, it may be sufficient to reduce the pH to below 7.0 by the addition of citric, lactic or a similar weak acid.

Depending upon the specific meat product formulation, it may be satisfactory to allow the treated skim milk powder to remain in the alkaline state above pH 7.0 and to use it as such.

The primary object of the treatment of the skim milk is to remove a substantial quantity of calcium and to replace it with hydrogen, sodium, or other non-injurious monovalent ion in order to result in a skim milk product with an increased ability to prevent fat from separating from sausage.

Ion-exchange treatments to reduce the quantity of calcium are described in U.S. Patent 1,954,769 (1934) to Lyman and U.S. Patent 2,490,599 (1940) to Otting, among others. Numerous publications on the subject of ion exchange methods are to be found in the literature.

EXAMPLE I

For the purposes of illustration, the comparative ability of regular dry skim milk and the specially treated dry skim milk to prevent fat separation in a test formula is described as follows:

Table I

TEST SAUSAGE—FORMULA A

|  | Grams |
|---|---|
| Lean pork leg meat | 1,240 |
| Lean beef chuck meat | 830 |
| Pork fat | 150 |
|  | 2,220 |
| Dry skim milk (regular or special) | 100 |
| Salt | 46 |
| Corn sugar (dry) | 25 |
| Sodium nitrite | 0.35 |
|  | 171.35 |
| Ice | 250 |
| Total weight | 2,641.35 |

PREPARATION AND TEST PROCEDURE

The meats and fat are passed through a grinder with ¼" holes in the grinder plate. The ground meats are mixed in order that a homogeneous product results.

The meat mixture is placed in a Hobart food cutter, and the combined dry skim powder, corn sugar, salt, and sodium nitrite added during the first 30 seconds of operation. Water, in the form of ice, is added during the next 60 seconds and the food cutter operation continued for a total elapsed time of 5.0 minutes.

The raw sausage mixture is chilled to 35° F. Exactly 200.0 grams of the mixture is placed into 307 x 113 cans and the cans closed.

The canned raw sausage mixture is placed in a 175° F. water bath and cooked for 38 minutes to an internal temperature of 155±2° F. The cooked, canned sausage is chilled to 35° F. overnight.

The cans are opened and the meat mass removed. Free fat is removed from the exterior of the cooked meat mass and combined with any free fat adhering to the interior can surface. The cleaned meat mass, the combined free fat, and any serum remaining in the can are separately weighed.

The meat mass is broken open and the presence of fat pockets determined visually.

Table II

RESULTS OF EXAMINING TEST FORMULA A USING REGULAR AND SPECIAL DRY SKIM MILK

|  | Weight of Meat Mass, gms. | Free Fat, gms. | Serum, gms. | Meat Interior |
|---|---|---|---|---|
| Regular Dry Milk solids | 166.6 | 4.87 | 28.57 | Numerous Fat Pockets. |
| Special Dry Milk solids | 181.1 | 0 | 18.90 | No Fat Pockets. |

EXAMPLE II

With the object of determining the ability of the special dry skim milk to prevent free fat accumulation compared to regular skim milk powder, the total amount of meat (pork, beef and pork fat) were kept at a constant weight as in Formula A but the proportion of pork fat varied in subsequent Formulas B–J. All other constituents of the base Formula A were kept at the same ratios.

Table III

VISUAL EVALUATION OF COOKED PRODUCT

| Formula | Fat As Percent of Total Meat | With Regular Dry Skim Milk | | With Special Dry Skim Milk | |
|---|---|---|---|---|---|
|  |  | Free Fat | Sausage Interior | Free Fat | Sausage Interior |
| B | 3 | 0 | Clear | 0 | Clear. |
| C | 4 | 0 | do | 0 | Do. |
| D | 5 | Small Amount Present. | Fat Pockets Present. | 0 | Do. |
| E | 6 | Large Amount Present. | Many Fat Pockets. | 0 | Do. |
| F | 7 |  |  | 0 | Do. |
| G | 8 |  |  | 0 | Do. |
| H | 9 |  |  | 0 | Do. |
| I | 10 |  |  | Small Amount Present. | Do. |
| J | 11 |  |  | Large Amount Present. | Fat Pockets Present. |

From the comparative observations noted in Table III, it is clear that when the formula is laden with excess fat, the special dry skim milk powder possesses a greater ability to prevent free fat appearance than does regular dry skim milk powder.

It was also noted from the results of the physical observation of the sausage formulations described in Table III that the sausage made using the special dry skim milk powder had a different appearance than when regular dry skim milk powder was used.

The sausage containing the special dry skim milk powder appeared to be dense, easily cut with a knife, and without a mushy or friable texture. When the sausage prepared with regular skim milk powder (containing the same amount of added fat) was compared to the sausage containing the special dry skim milk powder, the former appeared to be less dense, less firm when cut, with a more friable and mushy texture.

It is evident that the use of the special skim milk powder in place of regular skim milk powder as a sausage ingredient results in the advantageous changes noted below:

A. Prevents fat separation to the sausage surface
B. Minimizes fat pocket development in the body of the sausage
C. Produces a sausage having a dense appearance
D. Produces a less friable and mushy sausage
E. Produces a sausage having a dryer appearance For the purpose of clarity, the term "sausage" as used in the specification and claims refers to either cased sausages or meat loaf products of various formulations depending upon common commercial designation. Further, the term "sausage" refers to specialty products such as ravioli, meat balls, or potted meats and similar comminuted meat mixtures which may be encased in pastry or packaged in cans with gravy and the like.

At the present time Federal Government regulations specify that the maximum amount by weight of dry skim milk powder which may be added to sausage is 3½%. Hence, from the practical standpoint, i.e. in the light of the presently existing regulations, it is to be understood that the special dry skim milk powder specified in the appended claims is present in the sausage in an amount from above 0% to 3½% by weight.

What is claimed is:
1. A method of making a sausage product comprising treating liquid skim milk to replace 20–70% of the calcium content thereof with sodium ion, thereafter replacing sodium ion with hydrogen ion to the extent required to reduce the pH to the range of about 6.0–7.0, concentrating and drying said skim milk to obtain dry skim milk, and compounding an amount of said dry skim milk with comminuted meat.

2. A method of making a sausage product comprising treating liquid skim milk to replace 20-70% of the calcium content thereof with sodium ion, reducing the pH of said milk to the range of about 6.0-7.0 by the addition thereto of a weak acid of the group consisting of citric and lactic acids, concentrating and drying said skim milk to obtain dry skim milk, and compounding an amount of said dry skim milk with comminuted meat.

3. A method of making a sausage product comprising treating liquid skim milk to replace from about 20% to about 70% of the calcium content thereof with a monovalent ion taken from the group consisting of hydrogen and sodium ions, reducing the pH of said milk to the range of about 6.0-7.5, concentrating and drying said skim milk to obtain dry skim milk, and compounding an amount of said dry skim milk with comminuted meat.

4. A sausage product comprising comminuted meat and dry skim milk, said dry skim milk having served as a fat separation inhibitor in the sausage product pre-mixture, during the processing of said pre-mixture to obtain said sausage product, and having been derived from a liquid skim milk which has a pH in the range of about 6.0-7.5 and which has had at least 20% and up to about 70% of its calcium content replaced by a monovalent ion taken from the group consisting of hydrogen and sodium ions.

5. A sausage product comprising comminuted meat and dry skim milk, said dry skim milk having served as a fat separation inhibitor in the sausage product pre-mixture, during the processing of said pre-mixture to obtain said sausage product, and having been derived from a liquid skim milk which has a pH in the range of about 6.0-7.5 and which has had at least 20% and up to about 70% of its calcium content replaced by sodium ions.

References Cited in the file of this patent

UNITED STATES PATENTS

| | | |
|---|---|---|
| 1,954,769 | Lyman | Apr. 10, 1934 |
| 2,171,428 | Griffith et al. | Aug. 29, 1939 |
| 2,355,548 | Musher | Aug. 8, 1944 |
| 2,490,599 | Otting | Dec. 6, 1949 |
| 2,635,963 | Glabe | Apr. 21, 1953 |